A. M. Sawyer,
Cutlery Scourer.
N° 60,264. Patented Dec. 4, 1866.
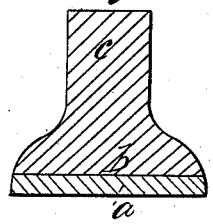
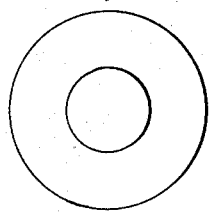
Witnesses:
Otis J. Stockwell
Walter Thorpe
Inventor:
A. M. Sawyer

United States Patent Office.

IMPROVED COMPOSITION OF MATTER FOR POLISHING METAL.

A. M. SAWYER, OF ATHOL, MASSACHUSETTS.

Letters Patent No. 60,264, dated December 4, 1866.

SPECIFICATION.

TO ALL WHOM IT MAY CONCERN:

Be it known that I, ADDISON M. SAWYER, of Athol, in the county of Worcester, and State of Massachusetts, have invented a new and useful Composition of Matter for Polishing or Scouring Metals and other hard substances; and I do hereby declare that the following is a full, clear, and exact description of the method of making and using the same, taken in connection with the accompanying drawing, in which—

Figure 1 is a vertical section through the centre of a device for scouring cutlery or other flat surface, which is constructed according to my improved method; and Figure 2 is a plan of the same.

The subject-matter of my invention relates to the method of making a scouring or polishing surface or material which may be applied to a variety of purposes, when the grinding, polishing, or scouring of a hard surface is required to be done, and consists, in the first place, in forming the polishing surface of a mixture of emery and soft vulcanized India rubber, as it is called, in such proportions that the rubber will hold the emery firmly, and at the same time retain so much of its elasticity or flexibility as will permit the surface to conform in a measure to the form of the object to be scoured; and in the second place, in attaching a thin sheet or layer of this compound to a backing of soft vulcanized rubber of any suitable form, to give strength and support to the layer of polishing compound, and permit it to adapt itself to the surface to which it is to be applied.

The drawings represent a pad or cushion, made in this manner, for scouring table knives and for other similar uses, the lower surface of which, $a$, for about one-tenth of an inch in thickness, is made of a mixture of emery and soft rubber, in the proportions, say, of from five to eight parts by weight of emery, to one of rubber, more or less, according to the purpose for which it is to be used, and to the fineness of the emery. The part, $b$, is made of common soft vulcanized rubber of any convenient form, the part, $c$, serving for a handle by which it is held by the user. In making the composition for scouring paint, I make the proportion of emery to rubber about four to one of rubber, and in using fine emery, I make the proportions a little greater than with coarse grades. For common scouring I have used emery of the grade known in the market as No. 90, and in some cases finer.

The manner of constructing this device is as follows: The emery and rubber, with the usual vulcanizing materials, are mixed by grinding or masticating them between rollers, and formed into a sheet, as in the usual way of making sheet rubber; a piece of this sheet is then cut to the required form for the polishing face, and is laid in the bottom of a mould of such form as is desired to be given to the piece; the rest of the mould is then filled with common soft rubber in the plastic condition, which adheres to the first layer. The whole is then vulcanized by heat in the usual way. Although my invention is shown in the drawings only as applied to a scouring pad, it is obviously applicable in other forms to the general purpose of scouring wood, metals, stone, paint, and sharpening cutlery, and a variety of uses of the same general character.

Having thus described my invention, what I claim, and desire to secure by Letters Patent, is as follows:

I do not claim forming a compound of emery and hard rubber, such as is known as "vulcanite," as that has been made before my invention; but I claim—

1. The polishing compound of emery and soft vulcanized rubber, made substantially as described.

2. The forming of the surfaces of polishing or scouring devices, by means of a thin layer of the polishing compound before described, united to a backing of soft vulcanized rubber, substantially as described.

Executed at Athol, this thirty-first day of May, 1866.

A. M. SAWYER.

Witnesses:
 OTIS J. STOCKWELL,
 WALTER THORP.